United States Patent Office 3,816,520
Patented June 11, 1974

3,816,520
PROCESS FOR PRODUCING AROMATIC SULFONATES
Charles V. Juelke, and Norman K. Cook, Morristown, N.J., said Juelke assignor to Celanese Corporation, New York, N.Y., and said Cook assignor to Fiber Industries, Inc.
No Drawing. Filed Apr. 13, 1970, Ser. No. 28,034
Int. Cl. C07c 143/42; C08g 17/00
U.S. Cl. 260—512 R         1 Claim

ABSTRACT OF THE DISCLOSURE

Hydroxy-containing aromatic sulfonates, useful as comonomers for imparting basic dyeability to polyesters, are produced by the reaction of a glycidyl ester of a carboxylic acid with a metallized salt of a hydroxy-containing aromatic sulfonic acid in the presence of a basic catalyst. The reaction is carried out in a solvent, and at temperatures greater than about 45° C.

BACKGROUND OF THE INVENTION

This invention relates to a process for producing aromatic sulfonates. More particularly, the invention is directed to a process for producing hydroxy-containing aromatic sulfonates which are capable of being incorporated into film- and fiber-forming linear synthetic polyesters which in turn can be shaped into articles such as films, fibers, and the like, having an affinity for basic dyes.

Successful methods have been suggested in the past to improve the dyeability of shaped articles, such as films, fibers, and fabrics made from linear synthetic polyesters wherein basic dyes are utilized to provide brighter colors and to permit cross dyeing of the shaped articles. These methods utilize the technique of incorporating sulfonated compounds into linear synthetic polyesters to provide basic dyeable compositions. A typical procedure for the preparation of modified synthetic polyester is represented by U.S. Pat. 3,018,272, which describes the process of producing basic dyeable polyesters having sulfonated monomers incorporated therein to form copolymers.

Typical of such sulfonated compounds which may be incorporated into polyesters to provide basic dyeable compositions are aromatic sulfonates wherein the sulfonate group is attached directly to an aromatic moiety. Additionally, said aromatic sulfonates must have at least one other group present in the molecule which will permit copolymerization of the aromatic sulfonate into the polyester. Commonly, these copolymerizable groups are hydroxy, carboxy, or alkoxycarbonyl. Although at least one such group is required, it is preferred to have two copolymerizable groups present in the sulfonate molecule. While one copolymerizable group will permit incorporation of the aromatic sulfonate into the polyester, such monofunctional aromatic sulfonates are chain-terminating and tend to restrict the resultant polyester compositions to relatively low molecular weights. The presence of more than two copolymerizable groups in the sulfonate molecule is equally undesirable, since such polyfunctional aromatic sulfonates tend to result in cross-linking which gives to the resultant polyester compositions a three-dimensional structure which renders spinning and drawing of such polyester compositions into fibers and filaments very difficult, if not impossible. Thus the presence in the aromatic sulfonate molecule of two copolymerizable groups is preferred, since such difunctional sulfonates are incorporated into the polyester compositions as copolymers without the deleterious effects of either chain-termination or cross-linking.

PRIOR ART

Aromatic sulfonates having a copolymerizable group or groups consisting of hydroxy only theoretically may be prepared by methods other than that disclosed herein, depending in part upon the structures of the desired compounds. Without attempting to present an exhaustive summary, the following descriptions are representative of several types of reactions which theoretically may be employed to prepare such hydroxy-containing aromatic sulfonates.

(1) The reaction of either (a) a metallic aryloxide with an alkyl halide or (b) a metallic alkoxide with an aralkyl halide. In general, a metallosulfo moiety would be a part of the metallic aryloxide or aralkyl halide, while the metallic alkoxide and alkyl halide would be substituted in such a manner as to provide, after reaction, the compounds of the present invention.

(2) The reaction of an aromatic alcohol with an aliphatic carbonate, with the aromatic alcohol containing the metallosulfo moiety. The aliphatic carbonate would be substituted as described in (1) above for the metallic alkoxide and alkyl halide.

(3) The addition of an aromatic alcohol to an alkene. The alkene would be substituted in such a manner as to provide the compounds of the present invention. In general, the aromatic alcohol would contain the metallosulfo moiety.

It should be apparent that in each of the above types of reactions the reaction may be carried out without the metallosulfo (or sulfo) moiety being a part of any reactant. The metallosulfo moiety may be introduced after reaction by sulfonation, followed by neutralization. This procedure, however, would not be preferred because the conditions of sulfonation give rise to competing side reactions which are not desirable. Furthermore, sulfonation of aromatic rings yields a mixture of several isomers which either must be used as such or given extensive purification in order to isolate the desired pure compound.

The process of the present invention has several important advantages over the processes outlined above. First, the yields of hydroxy-containing aromatic sulfonate products are signficantly improved, ranging usually from 70% to 95%. By comparison, process (1) above usually gives yields in the range of from 40% to 60%. Second, the process of the present invention avoids stringent reaction conditions, thereby reducing the likelihood that the reaction path will be other than that desired or expected. Third, the process of the present invention either avoids the generation of undesirable or unwanted by-products or results in the generation of by-products which may be easily and completely removed from the desired sulfonate product, said by-products being the result of the reaction proceeding as desired or expected. For example, process (1) above results in the formation of metallic halide salts which must be removed from the hydroxy-containing aromatic sulfonate products prior to incorporation of said sulfonate products into polyesters. Not only is considerable effort required to reduce the contamination by said halide salts to acceptable levels, thereby adding to the cost of producing said aromatic sulfonate products, but the requisite degree of purification of said aromatic sulfonate products also substantially reduces the yields of said aromatic sulfonate products. Thus the second and third advantages operate simultaneously to give hydroxy-containing aromatic sulfonate products of higher purity.

SUMMARY OF THE INVENTION

It is therefore an object of the present invention to provide a process for producing hydroxy-containing aromatic sulfonates which are capable of being incorporated into film- and fiber-forming linear synthetic polyesters having an affinity for basic dyes.

This and other objects will become apparent in the course of the specification and claim which follow.

Hydroxy-containing aromatic sulfonates, useful as comonomers for imparting basic dyeability to polyesters, are produced by the reaction of a glycidyl ester of a carboxylic acid with a metallized salt of a hydroxy-containing aromatic sulfonic acid in the presence of a basic catalyst. The reaction is carried out in a solvent in which said metallized salt is at least partly soluble, most preferably methanol, and at temperatures greater than about 45° C., most preferably at the reflux temperature of the solvent. The net reaction may be represented as follows, wherein R is the remainder of the glycidyl ester molecule, R' is the remainder of the hydroxy-containing aromatic sulfonate molecule, R" is either hydrogen or a monovalent lower alkyl radical, and M is a metal:

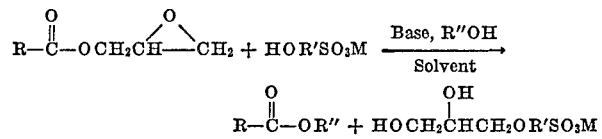

The glycidyl carboxylates employed in the process of this invention may be derived from mono-, di- or polycarboxylic acids. While it is preferred that all carboxy groups present in the molecule be in the form of a glycidyl ester, other esters or free carboxy groups may be present. Similarly, said metallized salts of hydroxy-containing aromatic sulfonates may contain one or more sulfonate groups and one or more hydroxy groups, as long as at least one hydroxy group is attached to an aromatic moiety.

DETAILED DESCRIPTION OF THE INVENTION

While the glycidyl carboxylates of the present invention may have other ester groups or even free carboxy groups present in the molecule, it is preferred that all carboxy groups be present in the form of a glycidyl ester. This preference stems partly from the difficulties involved in obtaining either mixed esters or ester acids. More important, however, is the fact that free carboxy groups consume an equivalent amount of basic catalyst, greatly increasing the amount of base employed in the reaction. Conversion of free carboxy groups to carboxylate salts in turn may unfavorably alter the solubility of said glycidyl carboxylates, either by increasing the ionic nature of said glycidyl carboxylates or by a "salting out" effect. Examples of glycidyl carboxylates which may be used in the process of this invention include, among others, glycidyl formate, glycidyl acetate, glycidyl propionate, glycidyl caproate, glycidyl laurate, glycidyl stearate, glycidyl α-toluate, glycidyl 2,3-dimethylbutanoate, glycidyl 4-hydroxybutanoate, glycidyl cyclohexanecarboxylate, glycidyl 2 - hydroxycyclohexanecarboxylate, glycidyl quinate, glycidyl benzoate, glycidyl p-toluate, glycidyl anisate, glycidyl asaronate, glycidyl 3-methylbenzoate, glycidyl 4 - phenylbenzoate, glycidyl durylate, glycidyl 1 - naphthoate, glycidyl 2 - naphthoate, glycidyl benzoylbenzoate, diglycidyl adipate, diglycidyl succinate, diglycidyl azelate, diglycidyl brassylate, diglycidyl tetramethylsuccinate, diglycidyl malate, diglycidyl tartarate, diglycidyl phloionate, diglycidyl 1,3 - cyclobutanedicarboxylate, diglycidyl 1,4 - cyclohexanedicarboxylate, diglycidyl phthalate, diglycidyl isophthalate, diglycidyl terephthalate, diglycidyl hemipate, diglycidyl α-cumidate, diglycidyl uvidate, diglycidyl α,2 - toluenedicarboxylate, diglycidyl diphenate, diglycidyl naphthalate, diglycidyl α-isatropate, diglycidyl 1,2-naphthalenedicarboxylate, diglycidyl p,p'-carbonyldibenzoate, diglycidyl benzoylterephthalate, triglycidyl trimesate, hexaglycidyl mellitate, monoglycidyl ester of adipic acid, monoglycidyl ester of terephthalic acid, monoglycidyl ester of trimesic acid, glycidyl methyl adipate, glycidyl methyl terephthalate, and the like. Examples of preferred glycidyl carboxylates include, among others, glycidyl acetate, glycidyl benzoate, diglycidyl adipate, diglycidyl phthalate, diglycidyl isophthalate, and diglycidyl terephthalate.

As stated hereinbefore, the metallized salts of hydroxy-containing aromatic sulfonic acids employed in the process of the present invention must have present in the molecule at least one aromatic hydroxy group. Additional hydroxy groups, either aromatic, aliphatic, or cycloaliphatic also may be present. It is preferred, however, that the single required aromatic hydroxy group be the only hydroxy group present in the molecule. The presence of other hydroxy groups will result in aromatic sulfonate products having more than two hydroxy groups which may result in cross-linking, as explained hereinbefore. Examples of hydroxy-containing aromatic sulfonic acids which may be employed in the process of the present invention as metallized salts include, among others, p-phenolsulfonic acid, o-phenolsulfonic acid, 2-phenyl-1-phenol-4-sulfonic acid, 3 - methyl - 1 - phenol - 4 - sulfonic acid, 1-naphthol-5-sulfonic acid, 2-naphthol - 7 - sulfonic acid, 2-naphthol-3,6 - disulfonic acid, 2 - naphthol - 6,8 - disulfonic acid, 4 - hydroxy - 4' - biphenylsulfonic acid, 4 - (4 - hydroxyphenoxy) benzenesulfonic acid, 4-resorcinolsulfonic acid, 2,3 - dihydroxynaphthalene - 6 - sulfonic acid, 4,5 - dihydroxy - 2,7 - naphthalene disulfonic acid, 3-(2-hydroxyethoxy) - 1 - phenol - 4 - sulfonic acid, 4 - (2 - hydroxyethyl) - 1 - phenol - 2 - sulfonic acid, 2,4,6-trihydroxybenzenesulfonic acid, 2,3,5,6 - tetrahydroxybenzenesulfonic acid, and the like. Examples of preferred hydroxy-containing aromatic sulfonates include, among others, p-phenolsulfonic acid, 2-phenyl-1-phenol-4-sulfonic acid, 3 - methyl - 1 - phenol - 4 - sulfonic acid, 1-naphthol-5-sulfonic acid, and 2-naphthol-7-sulfonic acid.

Although the use of any metallized salt of hydroxy-containing aromatic sulfonic acids is contemplated in the process of this invention, it is preferred that the metal portion of said salts be selected from the group consisting of the alkali metals. Most preferably, the metal portion (cation) will be lithium, since the resultant lithium hydroxy-containing aromatic sulfonate products, when incorporated into polyesters, result in polyester compositions which dye more deeply than polyester compositions containing metallized salts of hydroxy-containing aromatic sulfonic acids wherein the metal portion is a metal other than lithium.

The base employed as catalyst may be present in amounts up to about 50 mole percent, based on the amount of hydroxy-containing aromatic sulfonate. Amounts of base up to 100 mole percent and more also may be employed, but no advantage is gained thereby. While amounts of base less than about 20 mole percent may be employed, it is preferred that the base be used in amounts of about 25 mole percent in order to give maximum yields of hydroxy-containing aromatic sulfonate products. In general, the base may be any inorganic or organic base having a $pK_b$ less than about 7.5. By "$pK_b$" is meant the negative logarithm of the dissociation constant of the base. Typical of such bases are the hydroxides of alkali and alkaline earth metals, such as lithium hydroxide, sodium hydroxide, and barium hydroxide; alkali metal alcoholates of the lower aliphatic alcohols, such as sodium methoxide, potassium ethoxide, sodium n-propoxide, potassium t-butoxide, and the like; quaternary ammonium hydroxides, such as tetramethylammonium hydroxide, 2-hydroxyethyltrimethylammonium hydroxide, trimethylphenylammonium hydroxide, trimethylphenethylammonium hydroxide, and the like; other quaternary ammonium bases, such as 2-hydroxyethyltrimethylammonium methoxide, 2-hydroxyethyltrimethylammonium phenoxide, and the like; quaternary phosphonium hydroxides, such as tetrabutylphosphonium hydroxide, methyltrioctylphosphonium hydroxide, benzyltriphenylphosphonium hydroxide, triphenyl-2,3-dihydroxypropylphosphonium hydroxide, and the like; and tertiary amines, such as trimethylamine, triethylamine, triethanolamine, and the like. It is preferred that the base be selected from the group consisting of alkali metal hydroxides.

In general, the solvent employed must dissolve at least part of the metallized salts of hydroxy-containing aromatic sulfonic acids. Preferably, the recatants and catalyst will be completely soluble in the solvent used. Examples of suitable solvents include, among others, water, the lower aliphatic alcohols, dimethyl sulfoxide, dimethylformamide, tetrahydrofuran, and acetonitrile. By "lower aliphatic alcohols" is meant straight chain and branched alcohols having from 1 to about 6 carbon atoms. Depending upon the solubilities of the reactants, it may be desirable to use a mixed solvent system of two or more solvents, such as water and methanol, methanol and n-propanol, methanol and dimethylformamide, and water, methanol, and dimethyl sulfoxide. The preferred solvent is methanol.

Although the process of the present invention may proceed at measurable rates at temperatures below about 45° C., it is preferred that temperatures greater than about 45° C. be employed in order to complete the reaction in a reasonable length of time. Most preferably, the reaction is carried out at the reflux temperature of the solvent.

Without wishing to be bound by theory and while the exact mechanism is not known, it appears that the process of the present invention may be represented by the following sequence of reactions illustrating the reaction of diglycidyl terephthalate with lithium p-phenolsulfonate in the presence of lithium hydroxide:

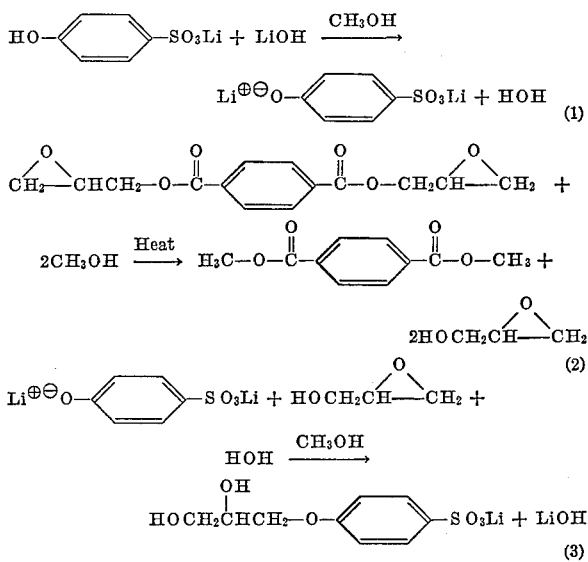

(3)

Since the amount of base employed usually is about 25 mole percent, based on the amount of hydroxy-containing aromatic sulfonate, all of the base added is neutralized as represented by equation (1). Thus there is present in the reaction solution (or mixture) prior to the addition of diglycidyl terephthalate the following entities: methanol, water, lithium p-phenolsulfonate, and the lithium salt of lithium p-phenolsulfonate (i.e., lithium 4-lithiosulfophenolate).

In support of the foregoing theory or reaction scheme, it has now been found in the laboratory by the present applicants that heating a methanolic solution of diglycidyl terephthalate results in the essentially quantitative generation of glycidol and dimethyl terephthalate in a molar ratio of 2:1; this result is suprising because the reaction proceeds in the absence of base or other catalyst. Furthermore, heating a methanolic solution of diglycidyl terephthalate in the presence of base gives dimethyl terephthalate and glycerin. Since the diglycidyl terephathalate is added to the above-described reaction solution (or mixture) heated to reflux, it seems reasonable to assume that the course of events is as represented by equations (2) and (3). The base reformed in equation (3) then reacts according to equation (1) with remaining lithium p-phenolsulfonate and the cycle continues until the reaction has gone to completion. While the foregoing perhaps is an over-simplification, it adequately explains the high yields obtained and the absence of glycerin as a significant by-product. Accordingly, the use of glycidyl carboxylates as described herein provides a means of generating glycidol *in situ*, and it should be possible to substitute said glycidyl carboxylates for glycidol in many reactions wherein glycidol is one of the reactants. Furthermore, said *in situ* generation of glycidol may take place over a wide temperature range, although elevated temperatures are preferred in order to provide practical reaction times. Also, the reaction may be carried out at atmospheric, sub-atmospheric, or super-atmospheric pressure and in any suitable solvent system, such as described hereinbefore for the process of the present invention since the solvent requirements for the process of the present invention and the *in situ* generation of glycidol are similar. Reaction sequence (3) in generalized and specific form is described and claimed in copending and commonly assigned application Ser. No. 28,542, filed by Charles V. Juelke concurrently herewith and now U.S. Pat. 3,712,919.

Incorporation of the hydroxy-containing aromatic sulfonates obtained by means of the present invention into linear synthetic polyesters provides sites for basic dyes. It usually is desirable to use at least about 0.5 weight percent of aromatic sulfonate based on the weight of polymer. Incorporation of less than 0.5 weight percent usually results in polymers having only a relatively low affinity for basic dyes. Polymers containing about 10 weight percent of aromatic sulfonate have a very high affinity for basic dyes. Higher concentrations will not lead to appreciable increases in basic dyeability and in general may unduly affect tenacity in the shaped articles. Concentrations of aromatic sulfonates in the range of 1 to 5 weight percent are preferred.

The term "linear synthetic polyester" as used herein includes as a preferred class polyester prepared from terephthalic acid or its dialkyl ester and a polymethylene glycol having the formula:

$$HO(CH_2)_nOH$$

wherein n is an integer from 2 to about 8. In this preferred class, the most preferred polyester, poly(ethylene terephthalate), is obtained when n is 2. If desired, the polymethylene glycol may be replaced entirely or in part with other glycols, such as 1,4-cyclohexanedimethanol, 1,4-bis (2-hydroxyethoxy)benzene, and the like; preferably, no more than about 10 percent of the polymethylene glycol will be replaced with another glycol. Additionally other dicarboxylic acids or their esters, such as adipic acid, succinic acid, isophthalic acid, 1,1,3-trimethyl-5-carboxy-3-(p-carboxyphenyl)indane, and the like may be added in amounts up to about 10 weight percent to produce copolyesters.

Various other materials may be present in the reaction mixture. For example, such ester interchange catalysts as salts of calcium, magnesium, manganese, cobalt, zinc, and the like and such polymerization catalysts as antimony trioxide, antimonic acid, germanium dioxide, stannous oxalate, organo-titanium compounds, and the like, usually will be present. Color inhibitors, such as alkyl or aryl phosphate esters, alkyl or aryl phosphite esters, and the like may be used. In addition, pigments, delustrants such as titanium dioxide, and other additives may be present.

The yarns or filaments in continuous or staple form produced from polyester compositions containing the hydroxy-containing aromatic sulfonates obtained in accordance with the present invention are suitable for the usual textile applications. They may be employed in the knitting or weaving of all types as well as in the production of non-woven, felt-like products produced by known methods. The physical properties of the modified yarns or filaments closely parallel those of their related non-modified polyester fibers. The modified yarns or filaments differ, however, in that they have a particular sensitivity toward basic dyes. By a "basic dye" is meant a colored cationic organic substance such as those containing sulfonium, oxonium, or quaternary ammonium functional groups. Among the basic types which may be applied either to the filaments in continuous or staple form obtained in accordance with the present invention or to fabrics prepared therefrom may be mentioned Victoria Green WB (C.I. Basic Green 4), a dye of the triphenylmethane type having the following chemical structure:

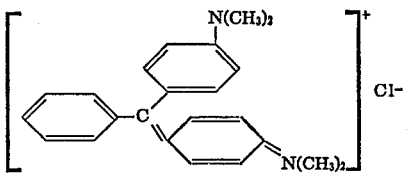

Victoria Pure Blue BO (C.I. Basic Blue 7), a triarylmethane type dye having the following chemical structure:

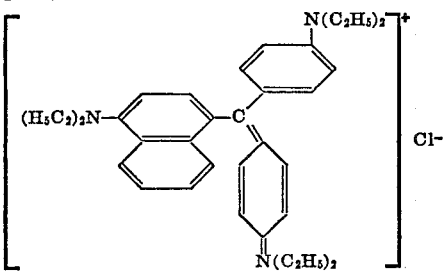

Sevron Blue 5G (C.I. Basic Blue 4), a dye of the oxazine type having the following chemical structure:

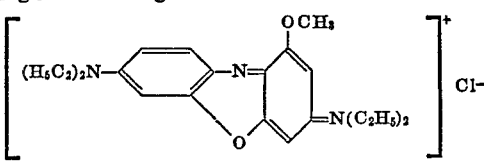

Brilliant Green B (C.I. Basic Green 1), a triphenylmethane type dye having the following chemical structure:

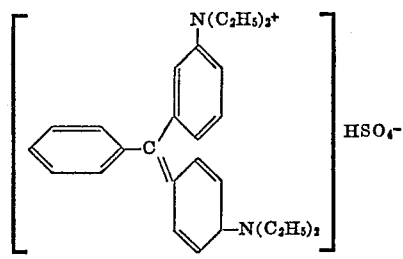

Rhodamine B (C.I. Basic Violet 10), a dye of the xanthene type having the following chemical structure:

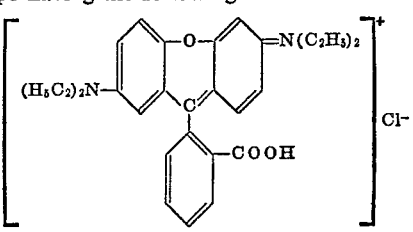

and the like. The dyes are preferably applied from an aqueous solution at a temperature between 80° C. and 125° C.

Filaments and films, i.e., shaped structures which have at least one dimension relatively very small and at least one dimension relatively large, are the preferred structures of the present invention. Such structures of the polyester compositions of this invention are permeated uniformly throughout by basic dyes applied from hot aqueous solution. The penetration of dyes is an important characteristic since poor resistance to fading and loss of color through rubbing or abrasion is a known characteristic of structures which retain dye only at their surface.

Without intending to limit it in any manner, the following examples will serve to illustrate the invention:

EXAMPLE 1

A reactor is charged with 396 parts of methanol, 45.0 parts of lithium p-phenolsulfonate, and 1.1 parts of lithium hydroxide monohydrate and the mixture heated to reflux. To the resultant solution is slowly added 34.8 parts of diglycidyl terephthalate. The resultant solution is refluxed for 5 hours. The reaction solution is concentrated by distilling methanol (262 parts) and the concentrate cooled to about 0° C. Crystals form which are removed by filtration and identified by infrared analysis as dimethyl terephthalate (28 parts). The filtrate is concentrated further by distilling methanol and cooling as before. A second crop of solid is obtained and isolated by filtration. Infrared analysis identifies the solid as 3-(4-lithiosulfophenoxy)-1,2-propanediol. A third crop of product is obtained by repeating the concentration-cooling procedure to give a total of 51.9 parts (82%) of 3-(4-lithiosulfophenoxy)-1,2-propanediol.

EXAMPLE 2

A reactor is charged with 198 parts of methanol, 22.5 parts of lithium p - phenolsulfonate, and 1.3 parts of lithium hydroxide monohydrate. The mixture is heated to reflux and 21.9 parts of diglycidyl terephthalate added slowly. The resultant solution is refluxed for five hours and the solution then is concentrated by distilling methanol. The concentrated solution is evaporated to dryness at 60° C. The residue, 51.2 parts, is washed with isopropanol, filtered, and dried. The washed residue, 47 parts, is a mixture of dimethyl terephthalate and 3-(4-lithiosulfophenoxy)-1,2-propanediol.

EXAMPLE 3

The procedure of Example 2 is repeated, except that the diglycidyl terephthalate is replaced with 20.0 parts of diglycidyl isophthalate dissolved in 40 parts of hot methanol. Also, after evaporating the reaction solution to dryness, the residue is washed with isopropanol, filtered, and dried. The yield of 3-(4-lithiosulfophenoxy)-1,2-propanediol is 29.2 parts (92%). An additional 1.7 parts (5.4%) of product is obtained by evaporating the isopropanol to dryness, extracting the residue with 50 parts of hot water, evaporating the water to dryness, and then washing the residue with isopropanol for a total yield of 30.9 parts (97.4%).

EXAMPLE 4

The procedure of Example 3 is repeated, except that the diglycidyl isophthalate is replaced with 18.9 parts of diglycidyl phthalate and the water extraction step is omitted. The yield of 3-(4-lithiosulfophenoxy)-1,2-propanediol is 28.2 parts (89%).

EXAMPLE 5

The procedure of Example 4 is repeated, except that methanol solvent is replaced with a solvent system consisting of 19 parts of methanol and 25 parts of water. After refluxing for 5 hours, solvent is distilled until a precipitate forms. The mixture is cooled to 70° C. and 78 parts of isopropanol added slowly. The resultant mixture is cooled to about 0° C. and the product isolated by filtration. The yield of 3-(4-lithiosulfophenoxy)-1,2-propanediol is 22 parts (70%).

EXAMPLE 6

The procedure of Example 2 is repeated, except that the diglycidyl terephthalate is replaced with 22.2 parts of glycidyl benzoate and two isopropanol washes are employed instead of just one. The yield of 3-(4-lithiosulfophenoxy)-1,2-propanediol is 24.5 parts (77%).

EXAMPLE 7

The procedure of Example 2 is repeated, except that the diglycidyl terephthalate is replaced with 14.5 parts of glycidyl acetate. The yield of 3-(4-lithiosulfophenoxy)-1,2-propanediol is 31.4 parts (99%).

EXAMPLE 8

The procedure of Example 2 is repeated, except that the diglycidyl terephthalate is replaced with 19.8 parts of diglycidyl adipate. The yield of 3-(4-lithiosulfophenoxy)-1,2-propanediol is 31 parts (98%).

EXAMPLE 9

The procedure of Example 2 is repeated, with similar results, except that the lithium p-phenolsulfonate is replaced with 24.5 parts of sodium p-phenolsulfonate and the lithium hydroxide mono-hydrate is replaced with 1.2 parts of sodium hydroxide.

EXAMPLE 10

The procedure of Example 2 is repeated, except that the lithium p-phenolsulfonate is replaced with 32 parts of lithium 2-phenylphenol-4-sulfonate. Similar results are obtained.

EXAMPLE 11

The procedure of Example 2 is repeated, except that the lithium p-phenolsulfonate is replaced with 24.3 parts of lithium 3-methylphenol-4-sulfonate. Similar results are obtained.

EXAMPLE 12

The procedure of Example 9 is repeated, except that the sodium p-phenolsulfonate is replaced with 30.8 parts of sodium 1-naphthol-5-sulfonate. Similar results are obtained.

EXAMPLE 13

The procedure of Example 9 is repeated, with similar results, except that the sodium p-phenolsulfonate is replaced with 30.8 parts of sodium 2-naphthol-7-sulfonate.

EXAMPLE 14

The procedure of Example 9 is repeated, except that the sodium p-phenolsulfonate is replaced with 24.5 parts of sodium resorcinol-4-sulfonate. Similar results are obtained.

EXAMPLE 15

The procedure of Example 9 is repeated, except that the sodium p-phenolsulfonate is replaced with 30.0 parts of sodium 3-(2-hydroxyethoxy)-1-phenol-4-sulfonate. Similar results are obtained.

EXAMPLE 16

Preparation of pre-polymer: A five-gallon jacketed autoclave, heated by means of a Dowtherm vapor system (heat transfer medium manufactured by Dow Chemical Company, Midland, Mich.) and fitted with an agitator and condenser, is charged with 30.0 parts of dimethyl terephthalate, 21.6 parts of ethylene glycol, and 0.0105 parts of magnesium carbonate. The mixture is heated to reflux at atmospheric pressure. The temperature of the mixture is about 187° C. when methanol begins to distill. Methanol distillation is complete after about 2.5 hours; batch temperature has increased to about 220° C. The mixture is extruded, cooled, ground, and packaged and referred to hereinafter as magnesium pre-polymer.

Preparation of polymer: An electrically-heated reactor, fitted with agitator, condenser, thermocouple, and means for operating under reduced pressure, is charged with 200 parts of magnesium pre-polymer and 0.2 part of antimony trioxide. The reactor is purged with nitrogen and heat applied. When the reaction mixture is molten, a solution of 5.8 parts of the product of Example 2 and 4.6 parts of adipic acid in 10 parts of hot ethylene glycol is added to the reactor. The resultant mixture is polymerized at about 280° C. at a pressure of less than 1.0 mm. mercury. The resultant polymer is extruded and is white in color with satisfactory properties. Fiber obtained from the polymer dyes to a medium shade of red with Sevron Brilliant Red B, a basic dye.

EXAMPLE 17

Using magnesium pre-polymer, the procedure of Example 16 is repeated, except that the product of Example 2 is replaced with 4.0 part of the product of Example 3. Similar results are obtained.

The polyester compositions comprising the hydroxy-containing aromatic sulfonate comonomers produced in accordance with this invention and incorporated therein as copolymers in generalized and specific forms are described and claimed in copending and commonly assigned Application Ser. No. 833,729, filed by Gerald W. Davis and Robert W. Stackman and now abandoned.

Having thus disclosed the invention, what is claimed is:

1. A process for producing hydroxy-containing aromatic sulfonates, said process comprising reacting diglycidyl terephthalate with a lithium salt of p-phenol-sulfonic acid in a solvent which is methanol and in the presence of lithium hydroxide and at a reaction temperature which is greater than about 45° C.

References Cited

UNITED STATES PATENTS

| | | | |
|---|---|---|---|
| 2,694,736 | 11/1954 | Pasedach | 260—512 R |
| 2,694,087 | 11/1954 | Petrie et al. | 260—512 R |
| 3,121,730 | 2/1964 | Distler | 260—456 R |

OTHER REFERENCES

"Peracetic Acid," Union Carbide Publication, pp. 18 and 19 (1957).

"Peracetic Acid," Union Carbide Publication, p. 40 (1957).

M. Barusch et al., "J. Am. Chem. Soc.," vol. 75 (1953), pp. 1987-8.

L. Brunel, "Ann. Chem. et Phys.," Series 8, Tomeb (1905), pp. 249-53.

P. Mesnard et al., "Chem. Abstracts," vol. 60 (1964), col. 4770g.

R. Hudson et al., "J. Chem. Soc.," (1964), pp. 5-15.

E. Windermuth et al., "Chem. Abstracts," vol. 60 (1964), columns 13451-2.

A. Farkas et al., "Chem. Abstracts," vol. 62 (1965), col. 7610f.

JOSEPH E. EVANS, Primary Examiner

U.S. Cl. X.R.

8—179; 260—75 S, 348 R, 348 A, 410.9 R, 468 R, 469, 475 N, 476 R, 485 R, 491, 613 D, 635 R